May 16, 1939.  W. R. KOCH  2,158,285
IMPULSE MEASURING CIRCUIT
Filed June 22, 1937   2 Sheets-Sheet 1
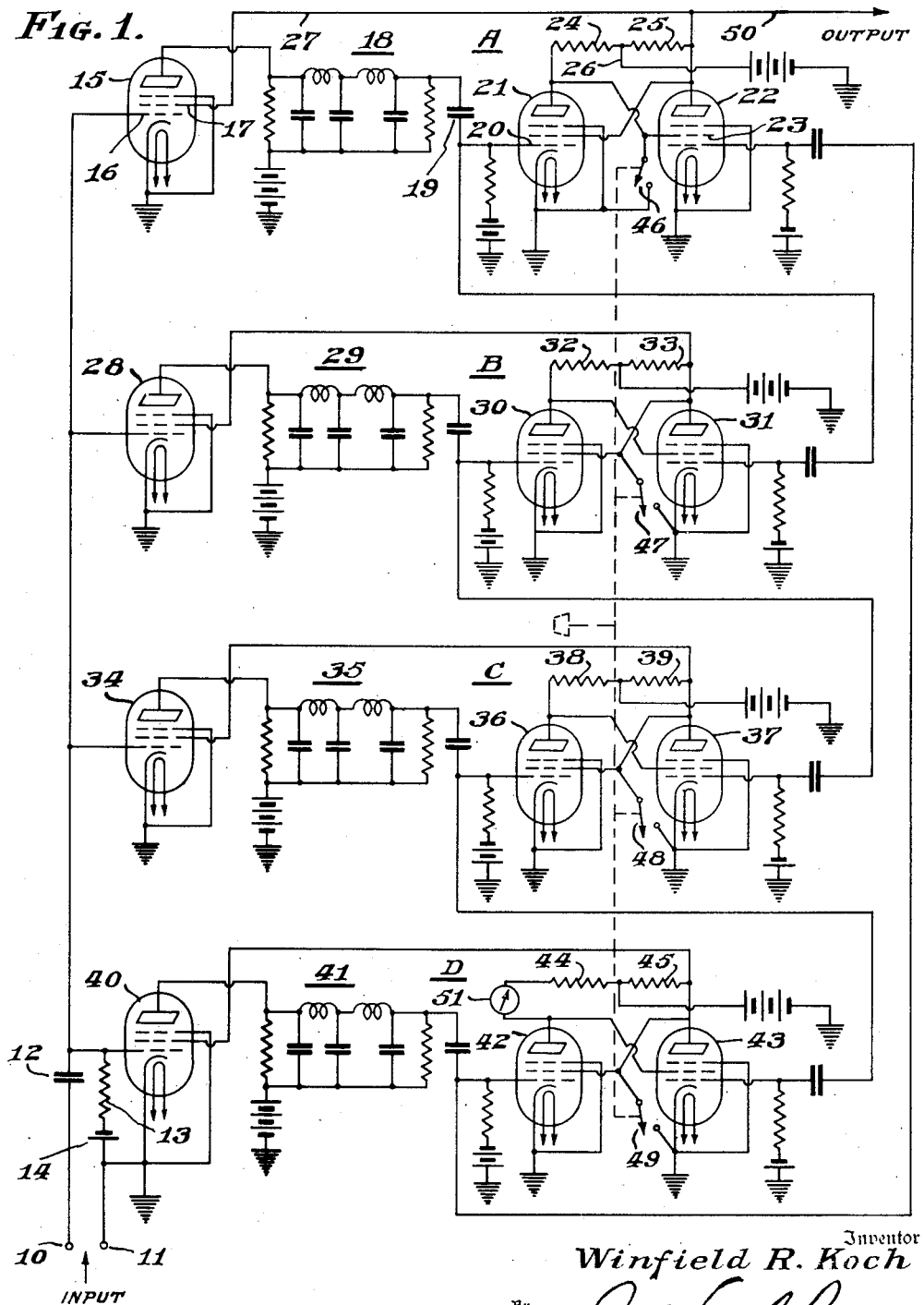
Inventor
Winfield R. Koch
By
Attorney

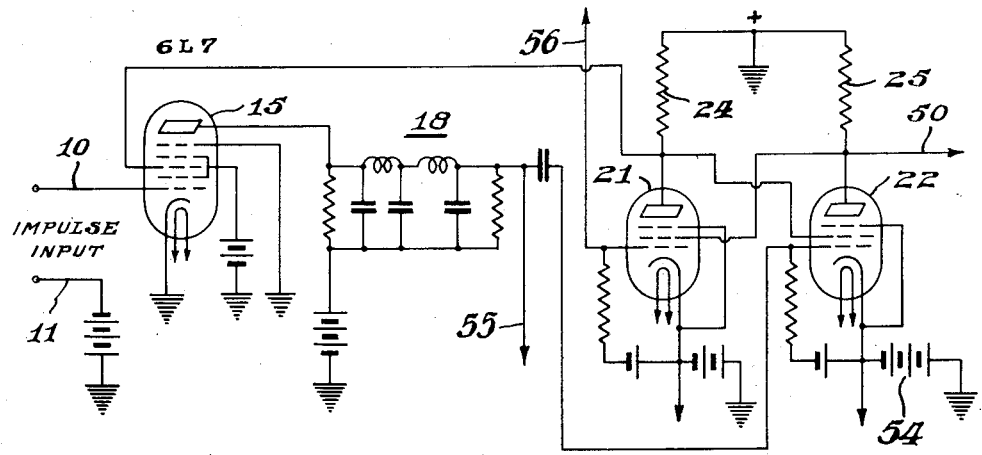
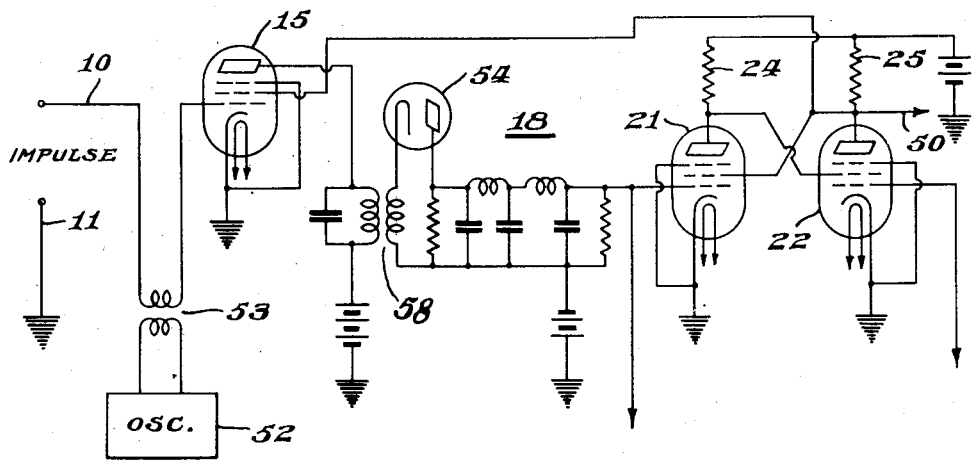

Patented May 16, 1939

2,158,285

UNITED STATES PATENT OFFICE 2,158,285

IMPULSE MEASURING CIRCUIT

Winfield R. Koch, Merchantville, N. J., assignor to Radio Corporation of America, a corporation of Delaware Application June 22, 1937, Serial No. 149,620

8 Claims. (Cl. 250—27)

This invention relates to impulse measuring circuits such as are useful in counting the number or measuring the duration of electrical impulses, and has for its principal object the provision of an improved impulse measuring device and method of operation whereby predetermined individual impulses of a sequence of successive impulses may be selected, indicated, recorded or otherwise utilized.

When controlled by a light-sensitive cell or the like, the improved device or circuit may be utilized to count the number of objects passing a given point or to measure the speed of such objects. It is also useful in reducing the impulse frequency to any desired extent and in measuring the duration of selected impulses such as those within a predetermined range of amplitudes or those of an amplitude exceeding a predetermined value. Other useful applications will be apparent to those skilled in the art.

As exemplified in its illustrated embodiment, the invention includes as one of its units an electron discharge device provided with an input circuit which receives the impulses to be counted or measured and with an output circuit which delivers these impulses through a delay network of a pair of electron discharge devices arranged to be rendered conductive one after the other and to render nonconductive the electron discharge device to which the impulses are first applied. As will hereinafter appear, a number of these units may be connected in a closed circuit to operate successively for producing impulses of a frequency which is a submultiple of the original frequency, for counting selected individual impulses of a series of successive impulses, for measuring in predetermined time units the duration of a single impulse or the like. The terms "open" and "closed" are hereinafter sometimes used with reference to an electron discharge device to indicate that the grid potential of such device is of a polarity to permit or preclude the flow of current through the plate circuit of the device.

The invention will be better understood from the following description when considered in connection with the accompanying drawings and its scope is indicated by the appended claims.

Referring to the drawings,

Figure 1 is a wiring diagram of an impulse measuring system including four similar units connected in a closed circuit and arranged to operate one after the other.

Figure 2 illustrates a modified form of unit which is more particularly suited for measuring the duration of an impulse when utilized in a closed circuit similar to that of Fig. 1, and Figure 3 illustrates a somewhat different unit which utilizes a radio frequency amplifier as the first stage and has the advantage that the output of the delay network may be directly coupled to the following stage, thus permitting impulses of very long duration to be utilized without resorting to excessively large blocking capacitors and shunting resistors.

The system of Fig. 1 includes four similar units A, B, C and D, each including an input circuit connected to the impulse input leads 10—11 through a capacitor 12 and shunted by a grid leak resistor 13 and C battery 14. Thus the unit A includes an input amplifier 15 which is provided with inner and outer control grids 16 and 17 and with an output circuit connected to a delay network 18. The output of the network 18 is coupled through a capacitor 19 to the inner control grid 20 of an electron discharge device 21 which is cross-connected with a similar device 22 to cause these two devices to take plate current alternatively. In the cross-connection, the outer control grid of the device 21 is connected to the anode of the device 22, the outer control grid 23 of the device 22 is connected to the anode of the device 21 and the anodes of the two devices are interconnected through a pair of resistors 24 and 25 through the common terminal 26 through which anode potential is applied to the devices 21 and 22. Closing of the device 15 after the reception of impulse is effected by means of a connection 27 between the inner control grid 17 and the anode of the device 22.

Similarly, the unit B includes an input device 28, a delay network 29 and a pair of devices 30 and 31 which are cross-connected through means including a pair of resistors 32 and 33; the unit C includes an input device 34, a delay network 35 and a pair of devices 36 and 37 which are cross-connected through means including resistors 38 and 39; and the unit D includes an input device 40, a delay network 41 and a pair of devices 42 and 43 which are cross-connected through means including resistors 44 and 45.

It will be observed that the delay network 18 of unit A is coupled to the inner control grid of the device 31 of unit B, the delay network of unit B is coupled to the inner control grid of the device 37 of unit C, the delay network 35 of unit C is coupled to the inner control grid of the device 43 of unit D, and the delay network 41 of unit D is coupled to the inner control grid of the device 22 of unit A. As hereinafter explained, these connections are provided to ensure that each of the units A, B, C and D is in condition to receive the impulse next after that transmitted by the preceding unit.

In considering the operation of the system of Fig. 1 to count impulses, it should be understood that the delay of the impulses in the networks 18, 29, 35 and 41 is as great or greater than the duration of the impulse. It should also be understood that closing and opening of the switch 46—47—48—49 causes current to flow through the resistors 24, 33, 39 and 45, thus rendering the control grids of the devices 22, 30, 36 and 42 more negative and causing current to be taken by the devices 21, 31, 37 and 43. Under these conditions the outer control grid of the device 15 is more positive than the outer control grids of the devices 28, 34 and 40 and the impulse transmitted through the net work 18 and applied to the inner control grids of the devices 21 and 31 increases the impedance of the electron discharge paths of these devices. Due to this increased impedance the outer control grid of the devices 22 and 30 are rendered more positive, these devices take an increasing amount of current, the outer control grids of the devices 21 and 31 become more negative, and the current of the devices 21 and 31 is interrupted. When this occurs the potential of the outer control grid of the device 15 becomes more negative due to the increased potential drop of the resistor 25, the outer control grid potential of the device 28 becomes more positive due to the decreased potential drop of the resistor 33 and the next impulse is taken by the device 28. Similarly, current is transferred from the unit B to the unit C, from the unit C to the unit D, from the unit D to the unit A, from the unit A to the unit B, etc.

Closing and opening of the switch 46 always results in the device 21 takening current and the device 22 not taking current, for the reason that closure of this switch reduces the potential of the grid 23 to zero and causes the plate current of the device 22 to become zero and to remain zero as long as the switch is closed. Under this condition, the voltage drop of the resistor 25 is relatively small and the middle grid of the device 21 is therefore highly positive. When the switch 46 is open, the current through it is interrupted, the drop of the resistor 24 is diminished, and the anode of the device 21 and the middle grid of the device 23 start to become positive. As soon as the anode of the device 21 is slightly positive, current flows to it, thus maintaining the drop of the resistor 24. The screen grid 23, however, must attain a definite positive potential, depending on the tube characteristics and the bias on the control or inner grid, before current can flow through the device 22.

Thus, the unit C is put into condition to receive the third impulse, the unit D is put into condition to receive the fourth impulse, the unit A is put into condition to receive the fifth impulse, etc. In order that control may thus be shifted from one unit to another for impulse counting, it is desirable that the delay of the impulse in the network 18, 29, etc., be as great or greater than the duration of the impulse, since otherwise one impulse may act as two impulses. In the system of Fig. 1, every fourth impulse may be derived from the output terminal 50 (Unit A), from the meter 51 connected in the anode circuit of the device 42 (Unit D) or from other suitable connections to the various units.

The unit of Fig. 2 differs from those of Fig. 1 in that the input device 15 is of a different type and the connections of the impulse input terminals 10—11 have been altered to permit measuring the duration of long impulses. It will be apparent that, with a number of these units connected in a closed circuit as illustrated by Fig. 1, an impulse enduring longer than the delay in the network 18 will operate the various units one after another at a rate dependent on the time constant of the various delay networks. The time or duration of an impulse is thus readily determined from the number of units operated or from the number of times any one of the units is operated. Thus the time required for an object to pass the view of a light-sensitive cell is determined. Other useful applications of the systems of Figs. 1 and 2 will be apparent to those skilled in the art.

The operation of the system of Fig. 2, like that of Fig. 1, is dependent on the production by a suitable switch or otherwise of an initial condition where the device 22 is open and the device 21 is closed. Under these conditions, the outer control grid of the device 15 is connected to the positive terminal of the battery 54 without appreciable potential drop in the resistor 24, the device 15 is open, a part of the relatively long impulse is transmitted through the device 15 and the network 18 to the inner control grid of the device 22 and to the lead 55, the electron path impedance of the device 22 is increased and its current is decreased, the outer control grid of the device 21 becomes more positive due to the decreased potential drop of the resistor 25, the device 21 takes current, the current of the device 22 is interrupted, and the device 15 is closed because of the more negative potential applied to its outer control grid from the lower terminal of the resistor 24.

Connected to the lead 55 is the inner control grid of the open tube of the unit to which the next part of the impulse is to be transferred. The lead 56 is connected to the network output terminal of the last unit in the series so that the impulse is transferred back to the first unit. The duration of the impulse is of course indicated by the frequency with which one of the units in operated.

The impulse measuring system of Fig. 3 differs from those previously described in that it includes a carrier frequency oscillator 52 which is coupled through a transformer 53 to the inner control grid of the input device 15 and a tuned transformer 58 connected to a rectifier or detector 54 which is interposed between the output circuit of the device 15 and the delay network 18. As previously indicated, this system has the advantage that the delay network may be directly coupled to the cross-connected devices 21 and 22, thus rendering it particularly useful in connection with impulses of very long duration which would otherwise necessitate the use of large blocking capacitors and coupling resistors. It will of course be understood that any desired number of these units may be connected in a closed circuit similar to that of Fig. 1 and that these various systems are susceptible of a large number of different uses. The operation of the unit of Fig. 3 is the same as that previously set forth in connection with the unit of Fig. 2 and therefore need not be repeated in detail.

While only a single element of the counter is illustrated in the modifications of Figs. 2 and 3, it should be understood that the same multiple contact switch as shown in Fig. 1 may be utilized to establish the desired initial condition. If desired, the use of the switch may be avoided and the initial condition established by (1) removing the tube 22 from its socket, (2) applying at least as many impulses as there are sections in the counter, and (3) replacing the tube. In this manner, removal of the tube 22 produces the same result as closing of the switch 46. Application of a series of impulses clears the counter, accomplishing the same result as operation of the switches 47, 48 and 49. The initial condition may also be established by placing tubes 22, 30, 36 and 42 in their respective sockets subsequent to the placing of the tubes 21, 31, 37 and 43 in their sockets.

I claim as my invention:

1. An impulse measuring system including an input device provided with an output circuit, a delay network coupled to said output circuit, a pair of electron discharge devices coupled to said network and cross-connected to operate one after the other, and means responsive to said successive operation for closing said input device.

2. An impulse measuring system including a plurality of similar units each comprising an input device provided with input and output circuits, a delay network coupled to said output circuit and a pair of electron discharge devices coupled to said network and cross-connected to be successively operated, means for applying the impulses to be measured to the input circuits of said units, and means for causing said impulses to be received successively by said units.

3. The combination of a pair of impulse input terminals, a plurality of input electron discharge devices each provided with an input circuit connected to said terminals, with a control circuit and with an output circuit, a delay network coupled to each of said output circuits, a pair of cross-connected electron discharge elements coupled to each of said networks, and means including said control circuits for causing said input devices to be operated one after the other in response to successive impulses.

4. The combination of a pair of impulse input terminals, a plurality of input electron discharge devices each provided with an input circuit connected to said terminals, with a control circuit and with an output circuit, a delay network coupled to each of said output circuits, a pair of cross-connected electron discharge elements coupled to each of said networks, and means interposed between each corresponding control circuit and pair of cross-connected devices for successively closing said input devices.

5. The combination of a pair of impulse input terminals, a plurality of input electron discharge devices each provided with an input circuit connected to said terminals, with a control circuit and with an output circuit, a delay network coupled to each of said output circuits, a pair of cross-connected electron discharge elements coupled to each of said networks, and means interposed between each delay network and a noncorresponding pair of cross-connected devices for successively opening said input devices.

6. The combination of a pair of impulse input terminals, a plurality of input electron discharge devices each provided with an input circuit connected to said terminals, with a control circuit and with an output circuit, a delay network coupled to each of said output circuits, a pair of cross-connected electron discharge elements coupled to each of said networks, means interposed between each control circuit and the corresponding pair of cross-connected devices for successively closing said input devices, aid means interposed between each delay network and a noncorresponding pair of cross-connected devices for successively opening said input devices.

7. The combination of a pair of impulse input terminals, a plurality of input electron discharge devices each provided with an input circuit connected to said terminals, with a control circuit and with an output circuit, a delay network coupled to each of said output circuits, a pair of cross-connected electron discharge elements coupled to each of said networks, and means for causing said input devices to be operated one after another at a speed dependent on the time constants of said networks.

8. The combination of an input electron discharge device provided with input, control and output circuits, a delay network coupled to said output circuit, a pair of cross-connected electron discharge devices coupled to said network, and means interposed between said control circuit and said cross-connected devices for closing said input device after a delay dependent on the time constant of said network.

WINFIELD R. KOCH.